United States Patent
Park et al.

(10) Patent No.: US 10,608,283 B2
(45) Date of Patent: Mar. 31, 2020

(54) ELECTROLYTE FOR LITHIUM SECONDARY BATTERY AND LITHIUM SECONDARY BATTERY INCLUDING THE SAME

(71) Applicant: SK Innovation Co., Ltd., Seoul (KR)

(72) Inventors: Dai In Park, Daejeon (KR); Jin Sung Kim, Daejeon (KR); Cheol Woo Kim, Daejeon (KR); Kwang Kuk Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 270 days.

(21) Appl. No.: 15/895,274

(22) Filed: Feb. 13, 2018

(65) Prior Publication Data

US 2018/0233778 A1 Aug. 16, 2018

(30) Foreign Application Priority Data

Feb. 14, 2017 (KR) .......................... 10-2017-0020153

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2220/30* (2013.01); *H01M 2300/004* (2013.01); *H01M 2300/0025* (2013.01)

(58) Field of Classification Search
None
See application file for complete search history.

(56) References Cited

U.S. PATENT DOCUMENTS 5,879,834 A 3/1999 Mao

FOREIGN PATENT DOCUMENTS

| JP | 2000077096 A | * | 3/2000 |
| JP | 2002260725 A | | 9/2002 |

* cited by examiner

*Primary Examiner* — Barbara L Gilliam
*Assistant Examiner* — Nathanael T Zemui
(74) *Attorney, Agent, or Firm* — The Webb Law Firm

(57) ABSTRACT

Provided are an electrolyte for a lithium secondary battery and a lithium secondary battery including the same, wherein the electrolyte for a lithium secondary battery of the present invention may improve DC-IR characteristic and battery storage characteristic, and may improve high-temperature stability, low-temperature characteristic, and lifespan characteristic to thereby be effectively used for manufacturing a secondary battery.

13 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2017-0020153 filed Feb. 14, 2017, the disclosure of which is hereby incorporated herein in its entirety by reference.

TECHNICAL FIELD

The following disclosure relates to an electrolyte for a lithium secondary battery and a lithium secondary battery including the same.

BACKGROUND

Recently, as portable electronic devices have been widely distributed and have become smaller, thinner, and lighter in weight, studies have been actively conducted to make a secondary battery used as a power source thereof small and lightweight while being chargeable and dischargeable for a long time.

The lithium secondary battery generates electrical energy by oxidation and reduction reactions when lithium ions are inserted into and removed from a cathode and an anode, and is manufactured by using materials capable of inserting and removing lithium ions as the cathode and the anode, and filling an organic electrolyte or a polymer electrolyte between the cathode and the anode.

The organic electrolyte that is currently widely used may include ethylene carbonate, propylene carbonate, dimethoxyethane, gamma butyrolactone, N,N-dimethylformamide, tetrahydrofuran, acetonitrile, etc. However, the organic electrolyte is generally easy to be volatile and has high flammability, and thus has problems in safety at high temperature such as ignition, etc., caused by an internal short-circuit when internal heating occurs due to overcharge or overdischarge when applying to a lithium ion secondary battery.

Further, when the lithium secondary battery is initially charged, lithium ions from lithium metal oxide, which is a cathode, move to a carbon electrode, which is an anode, to thereby be intercalated into carbon. At this time, a surface of carbon particles, which are anode active materials, reacts with an electrolyte since lithium has high reactivity, and thus, a coating film called a solid electrolyte interface (SEI) film is formed on the surface of the anode.

Performance of the lithium secondary battery largely depends on a constitution of the organic electrolyte and the SEI film formed by the reaction between the organic electrolyte and the electrode.

That is, the formed SEI film suppresses a side reaction between a carbon material and an electrolyte solvent, for example, decomposition of the electrolyte on the surface of the carbon particles which are the anode, prevents collapse of the anode material due to co-intercalation of the electrolyte solvent into the anode material, and faithfully performs a role as a lithium ion tunnel according to the related art, thereby minimizing deterioration of battery performance.

Therefore, various studies have been attempted to develop a novel organic electrolyte including an additive so as to solve the above problems.

For example, Japanese Patent No. 2002-260725 discloses a non-aqueous lithium ion battery capable of preventing overcharge current and the thus-resulting thermal runaway phenomenon by using an aromatic compound such as biphenyl. In addition, U.S. Pat. No. 5,879,834 discloses a method of improving battery stability by adding a small amount of aromatic compounds such as biphenyl, 3-chlorothiophene, etc., to be electrochemically polymerized in an abnormal over-voltage state, thereby increasing internal resistance. However, in the case of using the additives such as biphenyl, etc., in a normal operating voltage, when relatively high voltage is locally generated, the additives are gradually decomposed in a charge and discharge process, or when the battery is discharged at high temperature for a long time, amounts of biphenyl, etc., are gradually reduced, and thus, after 300 cycles of the charge and discharge process, there are problems in that safety may not be guaranteed, storage characteristic is reduced, etc.

Therefore, studies into technology of improving stability at high temperature and low temperature while maintaining a high capacity retention ratio have been still demanded.

SUMMARY

An embodiment of the present invention is directed to providing an electrolyte for a lithium secondary battery having excellent high-temperature and low-temperature characteristics while properly maintaining basic performance such as high efficiency charge and discharge characteristic, lifespan characteristic, etc., and a lithium secondary battery including the same.

In one general aspect, an electrolyte for a lithium secondary battery includes:

a lithium salt;

a non-aqueous organic solvent; and a nitrile compound represented by Chemical Formula 1 below:

[Chemical Formula 1]

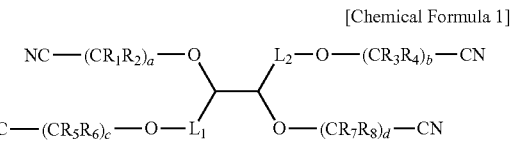

in Chemical Formula 1, $L_1$ and $L_2$ are each independently (C1-C10)alkylene, wherein the alkylene is optionally substituted with one or more selected from the group consisting of (C1-C7)alkyl, (C1-C7)alkoxy, (C1-C7)alkoxycarbonyl, and (C6-C12)aryl;

$R_1$ to $R_8$ are each independently hydrogen, (C1-C7)alkyl, (C1-C7)alkoxy, (C1-C7)alkoxycarbonyl or (C6-C12)aryl; and a to d are each independently an integer of 1 to 10.

In the electrolyte for a lithium secondary battery according to an exemplary embodiment of the present invention, the nitrile compound may be represented by Chemical Formula 2, Chemical Formula 3, Chemical Formula 4 or Chemical Formula 5 below:

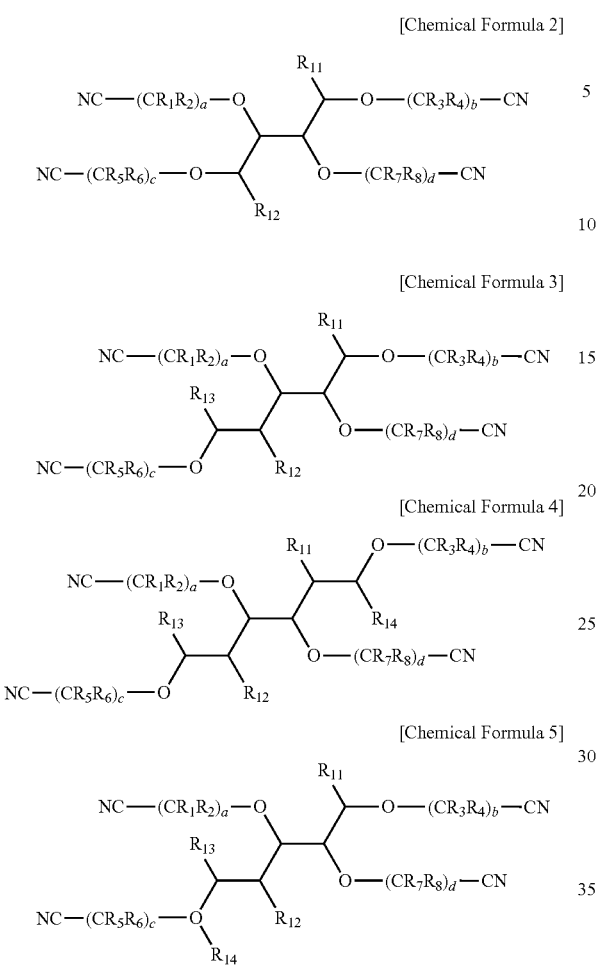

in Chemical Formulas 2 to 5, $R_1$ to $R_8$ are each independently hydrogen, (C1-C7)alkyl or (C1-C7)alkoxy;

$R_{11}$ to $R_{14}$ are each independently hydrogen, (C1-C7) alkyl, (C1-C7)alkoxy, or (C6-C12)aryl; and a to d are each independently an integer of 2 to 5.

In the electrolyte for a lithium secondary battery according to an exemplary embodiment of the present invention, the nitrile compound may be selected from the following structures:

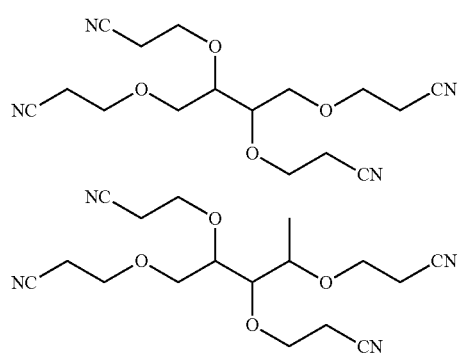

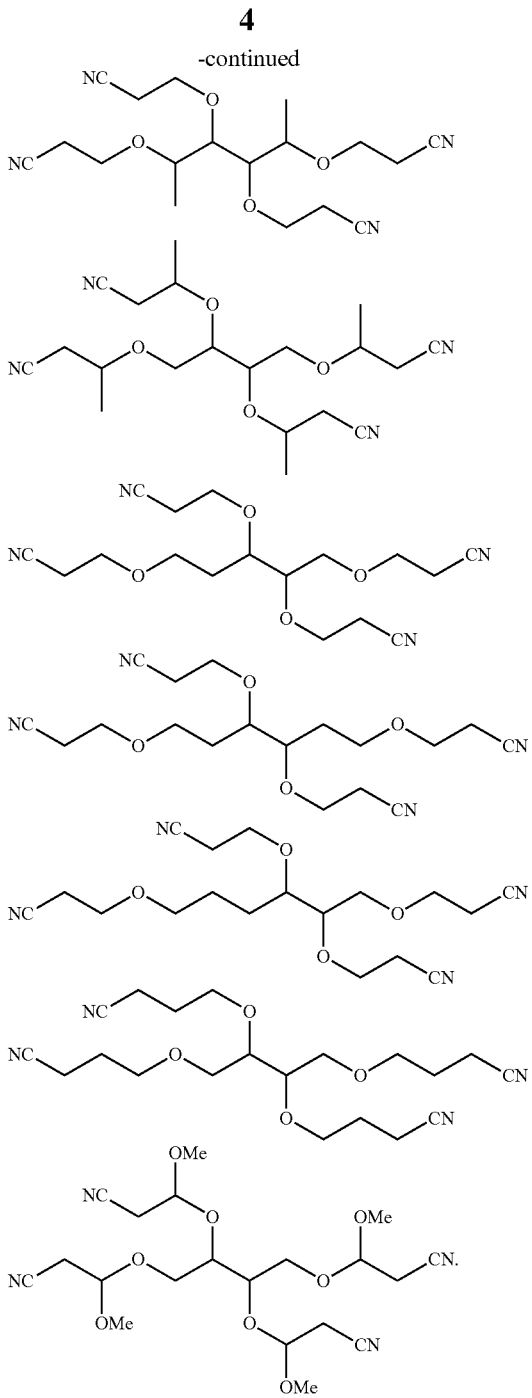

In the electrolyte for a lithium secondary battery according to an exemplary embodiment of the present invention, the nitrile compound represented by Chemical Formula 1 may have a content of 0.1 wt % to 15.0 wt % based on a total weight of the electrolyte.

In the electrolyte for a lithium secondary battery according to an exemplary embodiment of the present invention, the electrolyte may further include: one or two or more additives selected from the group consisting of an oxalatophosphate-based compound, an oxalatoborate-based compound, a carbonate-based compound substituted with fluorine, a vinylidene carbonate-based compound, and a sulfinyl group-containing compound.

In the electrolyte for a lithium secondary battery according to an exemplary embodiment of the present invention, the electrolyte may further include an additive selected from the group consisting of lithium tetrafluoro(oxalato)phosphate (LiTFOP), lithium difluoro bis(oxalato)phosphate (LiDFOP), lithium difluoro oxalatoborate (LiDFOB), lithium bisoxalatoborate (LiB(C$_2$O$_4$)$_2$, LiBOB), fluoro ethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

In the electrolyte for a lithium secondary battery according to an exemplary embodiment of the present invention, the additive may have a content of 0.1 wt % to 5.0 wt % based on a total weight of the electrolyte.

In the electrolyte for a lithium secondary battery according to an exemplary embodiment of the present invention, the non-aqueous organic solvent may be selected from a cyclic carbonate-based solvent, a linear carbonate-based solvent and a mixed solvent thereof, and the cyclic carbonate may be selected from the group consisting of ethylene carbonate, propylene carbonate, butylene carbonate, vinylene carbonate, vinyl ethylene carbonate, fluoro ethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a lithium secondary battery according to an exemplary embodiment of the present invention, a mixed volume ratio of the linear carbonate-based solvent and the cyclic carbonate-based solvent in the non-aqueous organic solvent may be 1:1 to 9:1.

In the electrolyte for a lithium secondary battery according to an exemplary embodiment of the present invention, the lithium salt may be one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiN(SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (wherein x and y are natural numbers), LiCl, LiI and LiB(C$_2$O$_4$)$_2$.

In the electrolyte for a lithium secondary battery according to an exemplary embodiment of the present invention, the lithium salt may be present at a concentration of 0.1 M to 2.0 M.

In another general aspect, there is provided a lithium secondary battery including the electrolyte for a lithium secondary battery as described above.

DETAILED DESCRIPTION OF EMBODIMENTS

Hereinafter, the present invention will be described in more detail. Here, unless technical and scientific terms used herein are defined otherwise, they have meanings understood by those skilled in the art to which the present invention pertains. Known functions and components which obscure the description and the accompanying drawings of the present invention with unnecessary detail will be omitted.

The present invention relates to an electrolyte for a lithium secondary battery so as to provide a battery having excellent low-temperature characteristic while having excellent high-temperature storage characteristic and excellent lifespan characteristic.

The present invention provides an electrolyte for a lithium secondary battery including: a lithium salt; a non-aqueous organic solvent; and a nitrile compound represented by Chemical Formula 1 below:

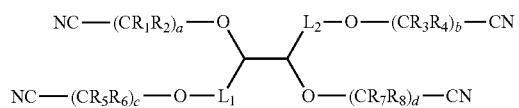

[Chemical Formula 1]

in Chemical Formula 1,

L$_1$ and L$_2$ are each independently (C1-C10)alkylene, wherein the alkylene is optionally substituted with one or more selected from the group consisting of (C1-C7)alkyl, (C1-C7)alkoxy, (C1-C7)alkoxycarbonyl, and (C6-C12)aryl;

R$_1$ to R$_8$ are each independently hydrogen, (C1-C7)alkyl, (C1-C7)alkoxy, (C1-C7)alkoxycarbonyl or (C6-C12)aryl; and a to d are each independently an integer of 1 to 10.

The secondary battery electrolyte of the present invention includes the nitrile compound represented by Chemical Formula 1 to have a high capacity recovery ratio at high temperature and a low thickness change rate, and thus, it is more stable at high temperature.

More specifically, the nitrile compound represented by Chemical Formula 1 of the present invention is a nitrile compound in the form of an aliphatic linear hydrocarbon compound into which four cyanoalkoxy groups are introduced, wherein each cyanoalkoxy group in the nitrile compound is bonded to a different carbon atom, and thus, the cyanoalkoxy group is not decomposed at all, four nitrile groups form a stable coating film on a cathode surface, and four oxygen atoms coordinate lithium ions so as to allow a distance between the cathode and the lithium ions to close to each other, and thus, resistance of the battery may be effectively reduced to increase high-temperature and low-temperature characteristics.

In the electrolyte for a lithium secondary battery according to an exemplary embodiment of the present invention, in Chemical Formula 1, L$_1$ and L$_2$ are methylene, ethylene, propylene or butylene; R$_1$ to R$_8$ are each independently hydrogen, methyl, ethyl, propyl, butyl, pentyl, hexyl or methoxy; the methylene, ethylene, propylene or butylene of L$_1$ and L$_2$ may be further substituted with one or more substituents selected from the group consisting of methyl, ethyl, propyl, butyl, pentyl, hexyl, methoxy and phenyl.

In the electrolyte for a lithium secondary battery according to an exemplary embodiment of the present invention, the nitrile compound may be represented by Chemical Formula 2, Chemical Formula 3, Chemical Formula 4 or Chemical Formula 5 below:

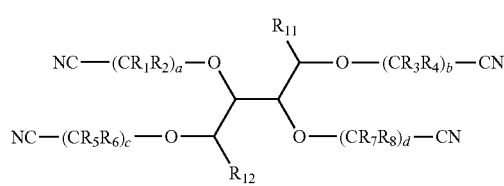

[Chemical Formula 2]

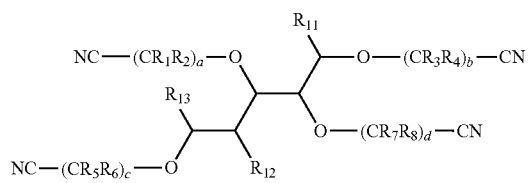

[Chemical Formula 3]

[Chemical Formula 4]

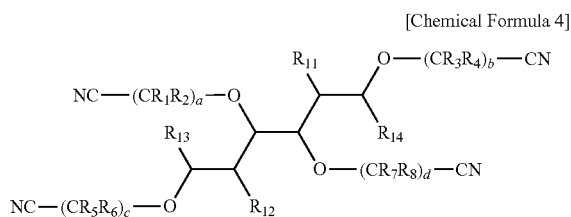

[Chemical Formula 5]

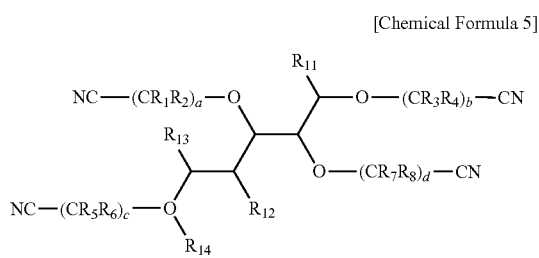

in Chemical Formulas 2 to 5, $R_1$ to $R_8$ are each independently hydrogen, (C1-C7)alkyl or (C1-C7)alkoxy;

$R_{11}$ to $R_{14}$ are each independently hydrogen, (C1-C7) alkyl, (C1-C7)alkoxy, or (C6-C12)aryl; and a to d are each independently an integer of 2 to 5.

In the electrolyte for a secondary battery according to an exemplary embodiment of the present invention, the nitrile compound may be preferably selected from the following structures, but is not limited thereto:

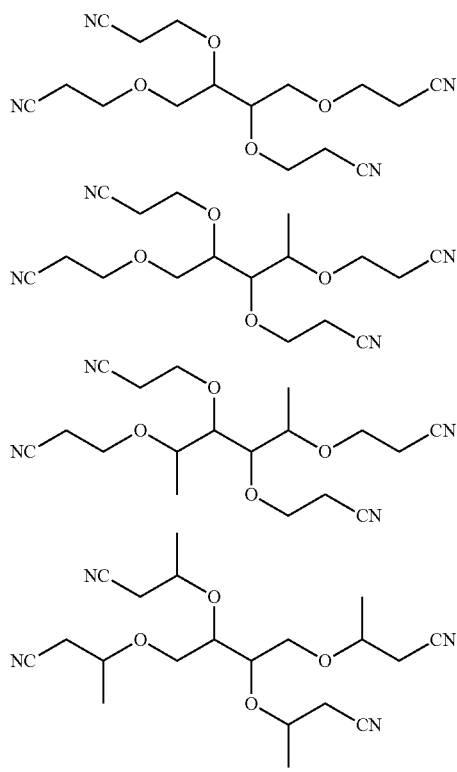

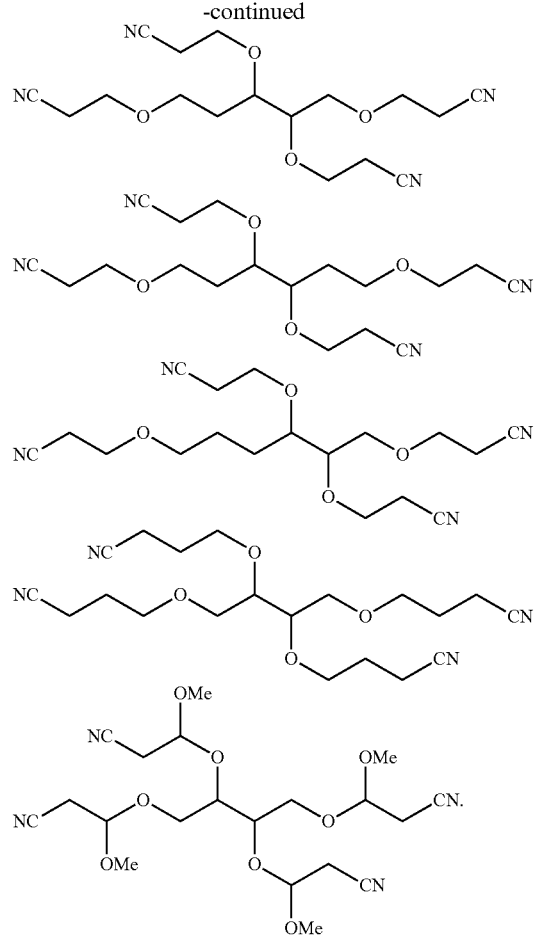

In order to further improve the high-temperature storage characteristic, lifespan characteristic and low-temperature characteristic in the electrolyte for a lithium secondary battery according to an exemplary embodiment of the present invention, in the nitrile compound represented by Chemical Formula 1, the cyanoalkoxy group may be preferably substituted on each of the four adjacent carbon atoms, that is, the nitrile compound may be a nitrile compound represented by Chemical Formula 2 in which $L_1$ and $L_2$ are methylene in Chemical Formula 1, and more preferably a nitrile compound represented by Chemical Formula 2 having a symmetrical structure. Furthermore, preferably, in the nitrile compound represented by Chemical Formula 2, a to d may be 2 or 3, and more preferably 2, and $R_1$ to $R_8$, $R_{11}$, and $R_{12}$ may be hydrogen.

In the electrolyte of the lithium secondary battery according to an exemplary embodiment of the present invention, the nitrile compound represented by Chemical Formula 1 may have a content of 0.1 to 15.0 wt %, 0.5 to 10 wt % in view of the low-temperature and high-temperature characteristics, and more preferably 0.5 to 5 wt %, based on the total weight of the electrolyte. When the content of the nitrile compound represented by Chemical Formula 1 is less than 0.1 wt %, improvement of a capacity retention ratio during storage at high temperature is insignificant, etc., and thus, an effect obtained by adding the nitrile compound is not shown, and further, an effect of improving a discharge capacity, output, or the like, of the lithium secondary battery is insignificant. When the content of the nitrile compound is more than 15.0 wt %, since a coating film on an electrode surface is formed too thick, resistance of the battery is increased, which causes rapid deterioration in lifespan, etc., and thus, characteristics of the lithium secondary battery are rather reduced.

In the electrolyte for a lithium secondary battery according to an exemplary embodiment of the present invention, the electrolyte may further include one or two or more additives selected from the group consisting of an oxalatophosphate-based compound, an oxalatoborate-based compound, a carbonate-based compound substituted with fluorine, a vinylidene carbonate-based compound, and a sulfinyl group-containing compound, as an additive for improving lifespan and high-temperature storage of the battery by being coordinated on the cathode surface to suppress gas generated by a decomposition reaction with an electrolyte solvent on the cathode surface.

The oxalatoborate-based compound may be a compound represented by Chemical Formula 6 below or may be lithium bisoxalato borate (LiB(C$_2$O$_4$)$_2$, LiBOB):

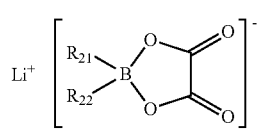

[Chemical Formula 6]

in Chemical Formula 6, R$_{21}$ and R$_{22}$ are each independently halogen, or halo(C1-C10)alkyl.

Specific examples of the oxalatoborate-based additive may include LiB(C$_2$O$_4$)F$_2$ (lithium difluoro oxalatoborate: LiDFOB), LiB(C$_2$O$_4$)$_2$ (lithium bisoxalatoborate: LiBOB), etc.

The oxalatophosphate-based additive may be a compound represented by Chemical Formula 7 or lithium difluoro bis(oxalato)phosphate (LiDFOP):

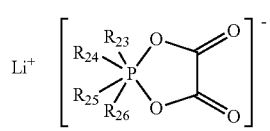

[Chemical Formula 7]

in Chemical Formula 7, R$_{23}$ to R$_{26}$ are each independently halogen, or halo(C1-C10)alkyl.

Specific examples of the oxalatophosphate-based additive may include lithium tetrafluoro(oxalato)phosphate (LiTFOP) or lithium difluoro bis(oxalato)phosphate (LiDFOP), etc.

The carbonate-based compound substituted with fluorine may be fluoro ethylene carbonate (FEC), difluoro ethylene carbonate (DFEC), fluorodimethyl carbonate (FDMC), fluoro ethyl methyl carbonate (FEMC) or a combination thereof.

The vinylidene carbonate-based compound may be vinylene carbonate (VC), vinylethylene carbonate (VEC), or a mixture thereof.

The sulfinyl group (S=O)-containing compound may be sulfone, sulfite, sulfonate and sultone (cyclic sulfonate), and may be used alone or in combination. Specifically, the sulfone may be represented by Chemical Formula 8 below, and may be divinyl sulfone. The sulfite may be represented by Chemical Formula 9 below, and may be ethylene sulfite, or propylene sulfite. The sulfonate may be represented by Chemical Formula 10 below, and may be diallyl sulfonate. In addition, non-limiting examples of the sultone may include ethane sultone, propane sultone, butane sultone, ethene sultone, butene sultone, propene sultone, etc.

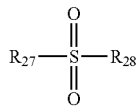

[Chemical Formula 8]

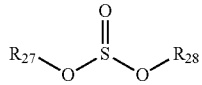

[Chemical Formula 9]

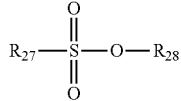

[Chemical Formula 10]

in Chemical Formulas 8 to 10, R$_{27}$ and R$_{28}$ are each independently hydrogen, halogen, (C1-C10)alkyl, (C2-C10)alkenyl, halo(C1-C10)alkyl or halo(C2-C10)alkenyl.

In the electrolyte for a lithium secondary battery according to an exemplary embodiment of the present invention, more preferably, the electrolyte may further include an additive selected from the group consisting of lithium tetrafluoro(oxalato)phosphate (LiTFOP), lithium difluoro bis(oxalato)phosphate (LiDFOP), lithium difluoro oxalatoborate (LiDFOB), lithium bisoxalatoborate (LiB(C$_2$O$_4$)$_2$, LiBOB), fluoro ethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS), and more preferably, may further include one or more additives selected from the group consisting of lithium tetrafluoro (oxalato)phosphate (LiTFOP), lithium difluoro bis(oxalato) phosphate (LiDFOP), lithium bisoxalatoborate (LiB(C$_2$O$_4$)$_2$, LiBOB), vinylene carbonate (VC), vinylethylene carbonate (VEC), ethylene sulfite, ethane sultone, and propane sultone (PS).

In the electrolyte for a lithium secondary battery according to an exemplary embodiment of the present invention, a content of the additive is not largely limited, but may be 0.1 wt % to 5.0 wt %, and more preferably, 0.1 wt % to 3 wt %, based on the total weight of the electrolyte for a secondary battery, in order to improve battery lifespan in the electrolyte for a secondary battery. When the additive is included in the content range, the electrolyte including the additive may be coordinated to the cathode surface to efficiently suppress gas generated by the decomposition reaction with the electrolyte solvent on the cathode surface, which is effective since the lifespan characteristic and high-temperature storage characteristic of the battery may be further improved.

In the electrolyte for a lithium secondary battery according to an exemplary embodiment of the present invention, the non-aqueous organic solvent may include carbonate, ester, ether, or ketone, or a mixed solvent thereof, but is preferably selected from a cyclic carbonate-based solvent, a linear carbonate-based solvent, and a mixed solvent thereof, and it is the most preferable to use a mixture of the cyclic carbonate-based solvent and the linear carbonate-based solvent. The cyclic carbonate solvent has a large polarity to be able to sufficiently dissociate the lithium ions, but has a disadvantage that ion conductivity is small since viscosity is high.

The cyclic carbonate may be selected from the group consisting of ethylene carbonate, propylene carbonate, butylene carbonate, vinylene carbonate, vinyl ethylene carbonate, fluoro ethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a lithium secondary battery according to an exemplary embodiment of the present invention, the non-aqueous organic solvent is a mixed solvent of the cyclic carbonate-based solvent and the linear carbonate-based solvent, wherein a mixed volume ratio of the linear carbonate-based solvent and the cyclic carbonate-based solvent may be 1:1 to 9:1, preferably, 1.5:1 to 4:1.

In the electrolyte for a lithium secondary battery according to an exemplary embodiment of the present invention, the lithium salt is not limited, but may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are natural numbers), LiCl, LiI and $LiB(C_2O_4)_2$.

The lithium salt may preferably have a concentration ranging from 0.1 M to 2.0 M, and more preferably, 0.7 M to 1.6 M. When the concentration of the lithium salt is less than 0.1 M, conductivity of the electrolyte is decreased, which deteriorates performance of the electrolyte, and when the concentration of the lithium salt is more than 2.0 M, viscosity of the electrolyte is increased, which decreases mobility of the lithium ions. The lithium salt acts as a source of lithium ions in the battery, which allows to perform basic operation of the lithium secondary battery.

The electrolyte for a secondary battery of the present invention may improve DC-IR characteristic and battery storage characteristic, and may improve high-temperature stability, low-temperature characteristic, and lifespan characteristic to thereby be effectively used for manufacturing the secondary battery.

The electrolyte for a lithium secondary battery of the present invention is generally stable at a temperature ranging from −20° C. to 80° C., and maintains electrochemically stable characteristic even at a voltage of 4.4V, and thus, the electrolyte for a lithium secondary battery of the present invention may be applied to all lithium secondary batteries such as a lithium ion battery, a lithium polymer battery, etc.

Further, the present invention provides a lithium secondary battery including the electrolyte for a lithium secondary battery as described above.

Non-limiting examples of the lithium secondary battery may include a lithium metal secondary battery, a lithium ion secondary battery, a lithium polymer secondary battery, a lithium ion polymer secondary battery, etc.

The lithium secondary battery manufactured from the electrolyte for a lithium secondary battery according to the present invention may have high-temperature and low-temperature characteristics while satisfactorily maintaining basic performances such as high efficiency charge and discharge characteristic, lifespan characteristic, etc.

The lithium secondary battery of the present invention includes a cathode and an anode.

The cathode includes a cathode active material capable of intercalating and removing the lithium ions, and the cathode active material is preferably a composite metal oxide of lithium and at least one selected from cobalt, manganese, and nickel. A solid-solution rate between the metals may be various, and the cathode may further include one element selected from the group consisting of Mg, Al, Co, K, Na, Ca, Si, Ti, Sn, V, Ge, Ga, B, As, Zr, Mn, Cr, Fe, Sr, V and rare earth elements in addition to these metals. As a specific example of the cathode active material, a compound represented by any one of the following Chemical Formulas may be used:

$Li_aAl_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_b$ (where $0 \leq b \leq 0.5$, $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aN_{i_b}E_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In Chemical Formulas above, A may be Ni, Co, Mn or a combination thereof; B may be Al, Ni, Co, Mn, Cr, Fe, Mg, Sr, V, a rare earth element or a combination thereof; D may be O, F, S, P, or a combination thereof; E may be Co, Mn or a combination thereof; F may be F, S, P or a combination thereof; G may be Al, Cr, Mn, Fe, Mg, La, Ce, Sr, V or a combination thereof; Q may be Ti, Mo, Mn or a combination thereof; I may be Cr, V, Fe, Sc, Y or a combination thereof; J may be V, Cr, Mn, Co, Ni, Cu or a combination thereof.

The anode includes an anode active material capable of intercalating and removing the lithium ions. Examples of the anode active material may include a carbon material such as crystalline carbon, amorphous carbon, carbon composite, carbon fiber, etc., lithium metal, an alloy of lithium and other elements, etc. For example, the amorphous carbon may be hard carbon, cokes, mesocarbon microbead (MCMB) fired at 1500° C. or less, mesophase pitch-based carbon fiber (MPCF), etc. The crystalline carbon may be a graphite-based material, and specifically, may be natural graphite, graphitized cokes, graphitized MCMB, graphitized MPCF, etc. The carbon material is preferably a material in which a d002 interplanar distance is 3.35 Å to 3.38 Å, and LC (crystallite size) by X-ray diffraction is at least 20 nm or more. The other elements forming the alloy with lithium may be aluminum, zinc, bismuth, cadmium, antimony, silicon, lead, tin, gallium or indium.

The cathode or the anode may be manufactured by dispersing an electrode active material, a binder and a conductive material, and if necessary, a thickening agent, in a solvent, to prepare an electrode slurry composition and applying the slurry composition onto an electrode current collector. Aluminum, aluminum alloy, etc., may be generally used for a cathode current collector, and copper, copper alloy, etc., may be generally used for an anode current collector. The cathode current collector and the anode current collector may have a foil type or a mesh type.

The binder is a material that serves to aid a paste for the active material, mutual adhesion of the active material, adhesion to the current collector, a buffering effect on expansion and contraction of the active material, etc., for example, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinylpyridine, styrene-butadiene rubber, and acrylonitrile-butadiene rubber, etc. A content of the binder is 0.1 wt % to 30 wt %, preferably, 1 wt % to 10 wt % based on the electrode active material. When the content of the binder is excessively small, adhesion force between the electrode active material and the current collector is not sufficient, and when the content of the binder is excessively large, adhesion force therebetween is increased, but the content of the electrode active material is decreased by the increased adhesion force thereof, which is disadvantageous for obtaining a high-capacity of battery.

The conductive material is used for imparting conductivity to the electrode, and may be any conductive material without causing chemical change in the battery to be constituted, and may be at least one selected from the group consisting of graphite-based conductive material, carbon black-based conductive material, metal or metal compound-based conductive material. Examples of the graphite-based conductive material include artificial graphite, natural graphite, etc. Examples of the carbon black-based conductive material include acetylene black, Ketjen black, Denka black, thermal black, channel black, etc. Examples of the metal-based conductive material or the metal compound-based conductive material include tin, tin oxide, tin phosphate ($SnPO_4$), titanium oxide, potassium titanate, perovskite materials such as $LaSrCoO_3$, and $LaSrMnO_3$. However, the conductive material of the present invention is not limited to the above-described conductive materials.

A content of the conductive material is preferably 0.1 wt % to 10 wt % based on the electrode active material. When the content of the conductive material is less than 0.1 wt %, electrochemical characteristic is deteriorated, and when the content of the conductive material is more than 10 wt %, energy density per weight is reduced.

The thickening agent is not particularly limited as long as it is able to serve to control viscosity of an active material slurry. For example, carboxymethyl cellulose, hydroxymethyl cellulose, hydroxyethyl cellulose, hydroxypropyl cellulose, etc., may be used.

A solvent in which the electrode active material, the binder, the conductive material, etc., are dispersed, may include a non-aqueous solvent or a water-based solvent. Examples of the non-aqueous solvent may include N-methyl-2-pyrrolidone (NMP), dimethylformamide, dimethylacetamide, N,N-dimethylaminopropylamine, ethylene oxide, tetrahydrofuran, etc.

The lithium secondary battery of the present invention may include a separator that prevents short-circuit between the cathode and the anode and that provides a moving path of the lithium ions. As such a separator, a polyolefin-based polymer film such as polypropylene, polyethylene, polyethylene/polypropylene, polyethylene/polypropylene/polyethylene, polypropylene/polyethylene/polypropylene, or the like, may be used or a multiple film, a microporous film, a woven fabric and a non-woven fabric thereof may be used.

Further, the separator may be a porous polyolefin film coated with a resin having excellent stability.

The lithium secondary battery of the present invention may have various shapes such as a cylindrical shape, a pouch shape, etc., in addition to a prismatic shape.

Hereinafter, Examples and Comparative Examples of the present disclosure will be described. However, the following Examples are merely provided as preferable examples of the present invention. Therefore, it is to be noted that the present invention is not limited to the following Examples. A base electrolyte may be formed by dissolving a lithium salt such as $LiPF_6$ in a basic solvent, with a corresponding amount so as to have a concentration of 1M, while assuming that all of the lithium salt is dissociated so that lithium ions have a concentration of 1M.

[Example 1] Synthesis of Compound 1

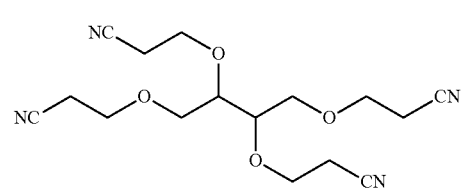

Meso-erythritol (73.2 g), 1,4-dioxane (450 mL), 50% KOH (6 mL) and primary distilled water (18 mL) were sequentially added to a 1 L round bottom flask, acrylonitrile (240 mL) was added thereto while stirring at room temperature, and then the obtained mixture was stirred at the same temperature for 24 hours. During the stirring, insoluble solids were completely dissolved, and a white solid was formed again. The formed solid was filtered through a Buchner funnel to remove the solution, thereby separating the resulting solid. The obtained solid was washed sequentially with primary distilled water (370 mL) and ethanol (370 mL), and then dried using a vacuum oven to obtain 129 g of the title compound 1 as a white solid.

$^1$H-NMR (500 MHz, $CDCl_3$) δ: 3.90 (quint, 2H, J=5.5 Hz), 3.70-3.80 (m, 10H), 3.64 (s, 2H), 2.55-2.70 (m, 8H)

[Examples 2 to 6 and Comparative Examples 1 to 4] Manufacture of Lithium Secondary Battery An electrolyte was manufactured by preparing a solution in which $LiPF_6$ was dissolved in a mixed solvent including ethylene carbonate (EC), ethyl methyl carbonate (EMC), and diethyl carbonate (DEC) at a volume ratio of 25:45:30 so as to have a concentration of 1.0 M, as a basic electrolyte (1M $LiPF_6$, EC/EMC/DEC=25/45/30), and further adding components shown in Table 1 below to the basic electrolyte.

A battery to which the non-aqueous electrolyte is applied, was manufactured as follows.

$LiNi_{0.6}Co_{0.2}Mn_{0.2}O_2$ as a cathode active material, carbon black as a conductive material, and polyvinylidene fluoride (PVDF) as a binder were mixed according to a mass ratio composition of 92:5:3, and dispersed in N-methyl-2-pyrrolidone to manufacture a cathode slurry. Then, the cathode slurry was coated on an aluminum substrate, dried, and pressed to manufacture a cathode.

Natural graphite as an anode active material, styrene-butadiene rubber (SBR) as a binder, carboxymethyl cellulose (CMC) as a thickening agent, and flake type amorphous graphite as a conductive material were mixed according to a weight ratio composition of 91:3:1:5, and dispersed in water to manufacture an anode slurry. The anode slurry was coated on a copper substrate, dried, and pressed to manufacture an anode.

A cell was configured by staking a film separator made of polyethylene (PE) and having a thickness of 25 μm between the manufactured electrodes, and using a pouch having a size of thickness 8 mm×width 270 mm×length 185 mm, and the non-aqueous electrolyte was injected thereto, thereby manufacturing a 1.4 Ah-class lithium secondary battery for EV.

Performance of the thus manufactured 1.4 Ah-class battery for EV was evaluated as follows, and results are shown in Table 2 below. Evaluation factors were as follows.

*Evaluation Factors*

1. Formation capacity: After the charge and discharge cycle at 0.5 C was performed twice, discharge capacity of the battery was measured at 0.5 C.

2. Measurement of direct current internal resistance (DCIR) at room temperature: The resistance was measured by using an end-voltage value obtained by charging the battery at a current of 0.5 C up to 60% of state of charge (SOC) at room temperature and performing the charge and discharge process at a current of 0.2 C, 0.5 C, 1 C, 1.5 C, 2 C, 2.5 C, and 3 C for 10 seconds, as a slope value of the linear plot.

3. −10° C. DCIR: The resistance was measured by using an end-voltage value obtained by charging the battery with 60% of state of charge (SOC) at room temperature, lowering a temperature to −10° C., followed by pausing for 3 hours, and performing the charge and discharge process at a current of 0.2 C, 0.5 C, 1 C, 1.5 C, 2 C, 2.5 C, and 3 C for 10 seconds, as a slope value of the linear plot.

4. Storage at 70° C. high temperature: The battery was charged with CC CV (4.2V, 0.05 C cut-off) at 1 C rate at room temperature, and stored at high temperature in a 70° C. oven for 6 weeks.

1) Thickness retention ratio: The battery was taken out from the oven. A thickness of the center in the hot state was measured by a thickness gauge, divided by the initial thickness before storage at 70° C., and calculated as a percentage.

Thickness retention ratio (%) of battery=(final thickness/initial thickness)×100(%)

2) IR retention ratio: After measuring the thickness of the battery, the battery was allowed to stand at room temperature for 30 minutes to lower a temperature of the battery, and then IR was measured by a resistance specific machine, divided by the initial IR before storage, and calculated as a percentage.

IR retention ratio (%) of battery=(final IR/initial IR)×100(%)

3) Capacity retention ratio: After the IR measurement, the capacity was measured by CC-discharging (2.7 V cut-off) the battery at 1 C rate, divided by the initial capacity before storage, and calculated as a percentage.

Capacity retention ratio (%) of battery=(final capacity/initial capacity)×100(%)

5. Lifespan at room temperature: A process of CC-CV charging the battery at room temperature at 1 C rate (4.2V, 0.05 C cut-off), and discharging the battery at a current of 1 C rate up to 2.7V was repeated 500 times. Here, when a discharge capacity at a first cycle is C, a capacity retention ratio of the lifespan was calculated by dividing a discharge capacity at 500th cycle by the discharge capacity at the first cycle.

TABLE 1

| Example | Composition of electrolyte (100 wt % in total) |
|---|---|
| Example 2 | Basic electrolyte + compound 1 (Example 1) 0.5 wt % + LiDFOP 1 wt % |
| Example 3 | Basic electrolyte + compound 2 0.5 wt % + LiDFOP 1 wt % |
| Example 4 | Basic electrolyte + compound 3 0.5 wt % + LiDFOP 1 wt % |
| Example 5 | Basic electrolyte + compound 4 0.5 wt % + LiDFOP 1 wt % |
| Example 6 | Basic electrolyte + compound 5 0.5 wt % + LiDFOP 1 wt % |
| Comparative Example 1 | Basic electrolyte + LiDFOP 1 wt % |
| Comparative Example 2 | Basic electrolyte + compound A 0.5 wt % + LiDFOP 1 wt % |
| Comparative Example 3 | Basic electrolyte + compound B 0.5 wt % + LiDFOP 1 wt % |
| Comparative Example 4 | Basic electrolyte + compound C 0.5 wt % + LiDFOP 1 wt % |
| Basic electrolyte | 1M LiPF$_6$, EC/EMC/DEC = 25/45/30 |
| LiDFOP | lithium difluoro bis(oxalato)phosphate |
| Compound 2 | 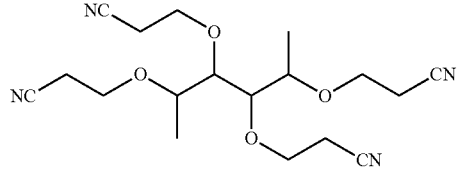 [SMILES: CC(OCCC#N)C(OCCC#N)C(OCCC#N)C(C)OCCC#N] |
| Compound 3 | 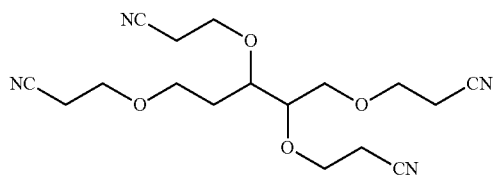 [SMILES: N#CCCOCCC(OCCC#N)C(COCCC#N)OCCC#N] |

TABLE 1-continued

Compound 4
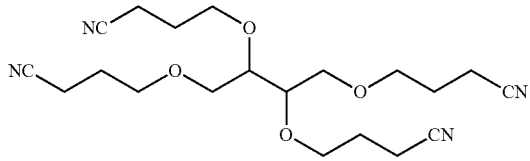 [SMILES: N#CCCCOCC(OCCCC#N)C(COCCCC#N)OCCCC#N]

Compound 5
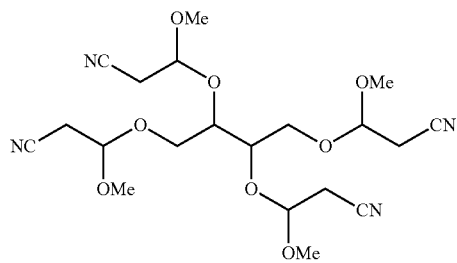 [SMILES: COC(CC#N)OCC(OC(CC#N)OC)C(COC(CC#N)OC)OC(CC#N)OC]

Compound A
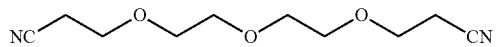 [SMILES: N#CCCOCCOCCOCCC#N]

Compound B
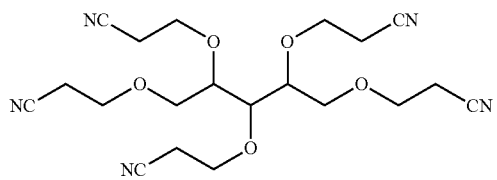 [SMILES: N#CCCOCC(OCCC#N)C(OCCC#N)C(COCCC#N)OCCC#N]

Compound C
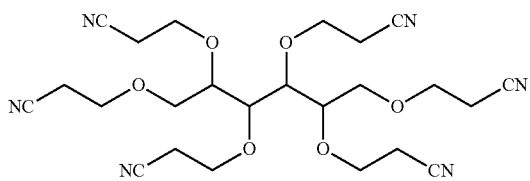 [SMILES: N#CCCOCC(OCCC#N)C(OCCC#N)C(OCCC#N)C(COCCC#N)OCCC#N]

TABLE 2

| Example | Formation Capacity | Charge DCIR (mΩ) | Discharge DCIR (mΩ) | −10° C. DCIR (mΩ) Charge | −10° C. DCIR (mΩ) Discharge | After stored at 70° C. for 6 weeks Capacity retention ratio | After stored at 70° C. for 6 weeks Thickness retention ratio | After stored at 70° C. for 6 weeks IR increase ratio | Lifespan @500 cy |
|---|---|---|---|---|---|---|---|---|---|
| Example 2 | 1352 | 28.01 | 29.01 | 98.8 | 100.4 | 76% | 160% | 185% | 81% |
| Example 3 | 1351 | 28.05 | 29.05 | 98.7 | 100.6 | 75% | 161% | 186% | 80% |
| Example 4 | 1349 | 28.14 | 29.35 | 99.4 | 101.6 | 73% | 162% | 190% | 79% |
| Example 5 | 1351 | 28.03 | 29.08 | 98.6 | 100.8 | 75% | 161% | 185% | 80.5% |
| Example 6 | 1350 | 28.11 | 29.10 | 98.9 | 101.0 | 74% | 162% | 187% | 79.5% |
| Comparative Example 1 | 1348 | 28.16 | 30.67 | 104.2 | 104.8 | 51% | 168% | 191% | 77% |
| Comparative Example 2 | 1351 | 28.61 | 31.13 | 101.3 | 103.0 | 65% | 163% | 202% | 75% |
| Comparative Example 3 | 1346 | 29.18 | 32.21 | 111.6 | 113.4 | 72% | 163% | 210% | 74% |
| Comparative Example 4 | 1349 | 29.03 | 32.66 | 118.8 | 119.6 | 70% | 161% | 200% | 75% |

As shown in Table 2, the lithium secondary batteries of Examples 2 to 6 including the electrolyte for a lithium secondary battery according to the present invention exhibited the same or higher formation capacity and lower internal resistance during the formation charge and discharge process and during the charge and discharge process at −10° C. as compared to those of Comparative Examples 1 to 4. In addition, the lithium secondary battery of Example 2 exhibited excellent high-temperature storage efficiency when the battery was allowed to stand at high temperature for a long period of time, and also exhibited lower IR increase ratio as compared to those of the Comparative Examples using other additives, and thus, it could be appreciated that the lithium secondary battery of Example 2 had excellent characteristic at high temperature.

In particular, the lithium secondary batteries of Examples 2 to 6 each using butane or pentane in which four cyanoethoxy groups were substituted as the additive exhibited lower internal resistance during the formation charge and discharge process and during the charge and discharge process at −10° C. as compared to those of Comparative Examples 3 and 4 including, as the additive, the compound B in which the cyanoethoxy group was bonded to each of five carbon atoms constituting pentane and the compound C in which the cyanoethoxy group was bonded to each of six carbon atoms constituting hexane. In addition, the lithium secondary batteries of Examples 2 to 6 had excellent storage efficiency at high temperature when the batteries were allowed to stand for a long time at high temperature, and exhibited low IR increase ratio, and thus, it could be appreciated that the lithium secondary batteries of Examples 2 to 6 had excellent characteristic at high temperature.

That is, it could be appreciated that in the lithium secondary batteries of Examples 2 to 6, compounds 1 to 5 each having a structure in which the cyanoethoxy group was bonded to each of four or five carbon atoms constituting butane or pentane were used as the additives, respectively, and thus, low internal resistance during the formation charge and discharge process and during the charge and discharge process at −10° C. was exhibited, the capacity retention ratio at high temperature was also very excellent as 73 to 76%, and the lifespan characteristic was also very excellent as 79 to 81%.

[Examples 7 to 11 and Comparative Examples 5 to 7] Manufacture of Lithium Secondary Battery An electrolyte was manufactured by preparing a solution in which $LiPF_6$ was dissolved in a mixed solvent including ethylene carbonate (EC), ethyl methyl carbonate (EMC), and diethyl carbonate (DEC) at a volume ratio of 25:45:30 so as to have a concentration of 1.0 M, as a basic electrolyte (1M $LiPF_6$, EC/EMC/DEC=25/45/30), and further adding components shown in Table 3 below to the basic electrolyte. A 1.0 Ah-class lithium secondary battery for EV was manufactured in the same manner as in Example 2 by using the manufactured electrolyte, and then, battery performance was evaluated, and results are shown in Table 4 below:

TABLE 3

| Example | Composition of electrolyte (100 wt % in total) |
|---|---|
| Example 7 | Basic electrolyte + Compound 1 (Example 1) 1.0 wt % + LiDFOP 1 wt % |
| Example 8 | Basic electrolyte + Compound 2 1.0 wt % + LiDFOP 1 wt % |
| Example 9 | Basic electrolyte + Compound 3 1.0 wt % + LiDFOP 1 wt % |
| Example 10 | Basic electrolyte + Compound 4 1.0 wt % + LiDFOP 1 wt % |
| Example 11 | Basic electrolyte + Compound 5 1.0 wt % + LiDFOP 1 wt % |
| Comparative Example 5 | Basic electrolyte + Compound D 1.0 wt % + LiDFOP 1 wt % |
| Comparative Example 6 | Basic electrolyte + Compound E 1.0 wt % + LiDFOP 1 wt % |
| Comparative Example 7 | Basic electrolyte + Compound F 1.0 wt % + LiDFOP 1 wt % |
| Basic electrolyte | 1M $LiPF_6$, EC/EMC/DEC = 25/45/30 |
| LiDFOP | lithium difluoro bis(oxalato)phosphate |
| Compound 2 | [chemical structure] |
| Compound 3 | [chemical structure] |
| Compound 4 | [chemical structure] |

TABLE 3-continued

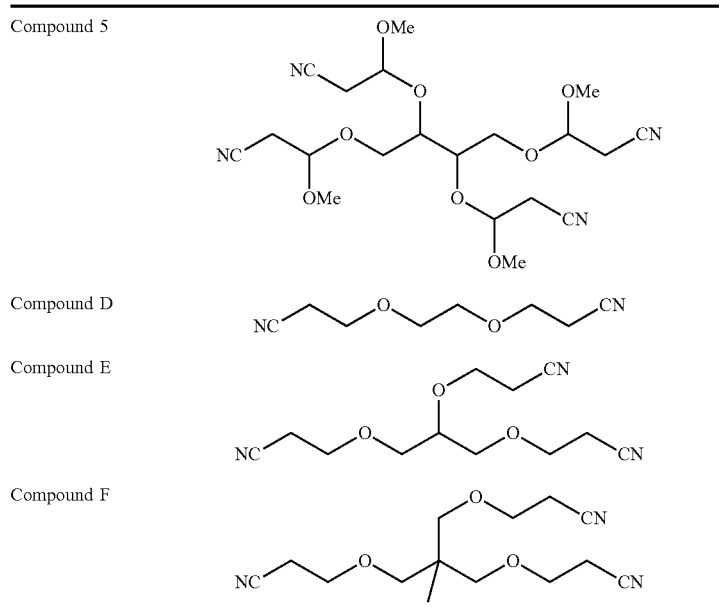

| | Compound 5 |
| --- | --- |
| | Compound D |
| | Compound E |
| | Compound F |

TABLE 4

| | | Formation | | −10° C. DCIR | | After stored at 70° C. for 4 weeks | | | Lifespan |
| --- | --- | --- | --- | --- | --- | --- | --- | --- | --- |
| | | | | | | Capacity retention ratio | Thickness retention ratio | IR increase ratio | |
| Example | Capacity | Charge DCIR | Discharge DCIR | Charge | Discharge | | | | @500 cy |
| Example 7 | 1171 | 30.05 | 33.20 | 156.1 | 158.7 | 61% | 143% | 196% | 91% |
| Example 8 | 1170 | 30.09 | 33.23 | 156.3 | 158.9 | 60% | 144% | 197% | 90% |
| Example 9 | 1169 | 30.34 | 34.11 | 159.1 | 161.8 | 55% | 148% | 203% | 89% |
| Example 10 | 1171 | 30.04 | 33.27 | 156.2 | 158.8 | 58% | 143% | 196% | 90.5% |
| Example 11 | 1170 | 30.11 | 33.31 | 156.7 | 159.1 | 59% | 146% | 198% | 90% |
| Comparative Example 5 | 1167 | 31.37 | 37.61 | 187.6 | 225.3 | 35% | 160% | 342% | 71% |
| Comparative Example 6 | 1167 | 31.76 | 37.31 | 188.8 | 226.4 | 29% | 158% | 432% | 60% |
| Comparative Example 7 | 1169 | 30.95 | 35.60 | 184.5 | 214.7 | 27% | 154% | 413% | 88% |

As shown in Table 4, the lithium secondary batteries of Examples 7 to 11 including the electrolyte for a lithium secondary battery according to the present invention exhibited higher formation capacity and lower internal resistance during the formation charge and discharge process and during the charge and discharge process at −10° C. as compared to those of Comparative Examples 5 to 7. In addition, the lithium secondary batteries of Examples 7 to 11 exhibited excellent high-temperature storage efficiency when the battery was allowed to stand at high temperature for a long period of time, and also exhibited lower IR increase ratio as compared to those of Comparative Examples using other additives, and thus, it could be appreciated that the lithium secondary batteries of Examples 7 to 11 had excellent characteristic at high temperature.

In particular, it could be appreciated that in the lithium secondary batteries of Examples 7 to 11, compounds 1 to 5 each having a structure in which the cyanoethoxy group was bonded to each of four or five carbon atoms constituting butane or pentane were used as the additives, respectively, and thus, as compared to the Comparative Examples 5 and 6 including, as the additive, the compound D in which the cyanoethoxy group was bonded to each of two carbon atoms constituting ethane and compound E in which the cyanoethoxy group was bonded to each of three carbon atoms constituting propane and as compared to the Comparative Example 7 including the compound F in which the cyanoethoxy group was bonded to three carbon atoms constituting isobutane as the additive, low internal resistance during the formation charge and discharge process and during the charge and discharge process at −10° C. was exhibited, the capacity retention ratio at high temperature was also very excellent as 55 to 61%, and the lifespan characteristic was also very excellent as 89 to 91%.

As described above, the excellent characteristics of the lithium secondary batteries of Examples 2 to 11 are obtained by the structural characteristics of the nitrile compound added to the basic electrolyte. The nitrile compound of the present invention has a structure in which four oxygen atoms each are substituted on the carbon atoms constituting the central carbon chain, four nitrile groups are introduced to the end, respectively, and carbon chains are connected between each oxygen atom and each nitrile group, that is, a symmetric aliphatic hydrocarbon compound in which four cyanoalkoxy groups are introduced. Thus, the nitrile compound of the present invention has a structure different from that of an aliphatic hydrocarbon compound in which 2, 3, 5, or 6 cyanoalkoxy groups are introduced as in Comparative Examples 2 to 7.

That is, the compounds A, D, E and F in which two or three cyanoalkoxy groups were introduced as in Comparative Examples 2, 5, 6 and 7 stabilized the cathode surface, and thus, an effect on the storage characteristic at high temperature was exhibited, but the low-temperature performance was reduced by the increased resistance. Further, the compounds B and C in which 5 or 6 cyanoalkoxy groups were introduced as in Comparative Examples 3 and 4 exhibited the increased resistance, and the storage stability at high temperature and the lifespan characteristics at room temperature were reduced.

However, the electrolyte for a lithium secondary battery according to the present invention includes the nitrile compound in the form of the aliphatic linear hydrocarbon compound into which four cyanoalkoxy groups are introduced, wherein each cyanoalkoxy group in the nitrile compound is bonded to a different carbon atom so that 4 nitrile groups are able to be coordinated to the flat surface of the cathode, thereby stabilizing the transition metal of the cathode while simultaneously acting as a coating film for inhibiting a direct reaction with the electrolyte, and four oxygen atoms included in the nitrile compound allow to coordinate the lithium ions so as to close the distance between the cathode and the lithium ions, and thus, it may be appreciated that it is possible to improve excellent high-temperature characteristic, high-temperature stability, low-temperature characteristic and lifespan characteristic at room temperature.

From the above results, it may be appreciated that the lithium secondary battery including the electrolyte for a lithium secondary battery according to the present invention exhibits the high capacity recovery ratio even after long-term storage at high temperature, and has the low IR increase ratio to thereby have very high stability at high temperature, and further, a difference in internal resistance value during the charge and discharge at −10° C. is low and the lifespan characteristic at room temperature is excellent. Therefore, it may be confirmed that the nitrile compound represented by Chemical Formula 1 included in the electrolyte for a lithium secondary battery of the present invention improves the high-temperature stability, the high-temperature characteristic and the low-temperature characteristic of the lithium secondary battery.

The electrolyte for a lithium secondary battery according to the present invention may include the nitrile compound represented by Chemical Formula 1 to stabilize the surface of the cathode and to appropriately coordinate lithium ions through oxygen atoms in the molecule, thereby reducing the resistance, and thus, it is possible to improve the charge and discharge characteristics and resistance at high temperature. The electrolyte for a lithium secondary battery according to the present invention includes the nitrile compound in the form of the aliphatic linear hydrocarbon compound into which four cyanoalkoxy groups are introduced, wherein each cyanoalkoxy group in the nitrile compound is bonded to a different carbon atom so that 4 nitrile groups are able to be coordinated to the flat surface of the cathode, thereby stabilizing the transition metal of the cathode while simultaneously acting as a coating film for inhibiting a direct reaction with the electrolyte, and four oxygen atoms included in the nitrile compound allow to coordinate the lithium ions so as to close the distance between the cathode and the lithium ions, and thus, the resistance of the battery is relatively less increased as compared to the additive only consisting of carbon such as succinonitrile (SN), and adiponitrile (AN). Therefore, it is possible to suppress deterioration of the low-temperature characteristic while providing excellent lifespan characteristic and high-temperature stability.

Further, the lithium secondary battery according to the present invention may employ the electrolyte for a lithium secondary battery including the nitrile compound represented by Chemical Formula 1 according to the present invention to thereby have excellent high-temperature storage stability and low-temperature characteristics while excellently maintaining basic performance such as high efficiency charge and discharge characteristic, lifespan characteristic, etc.

While the present invention has been described in detail with respect to exemplary embodiments thereof as described above, it will be appreciated by those skilled in the art that various changes can be made therein without departing from the spirit and scope of the invention as defined by the appended claims. Therefore, further modifications in the embodiments of the present invention will not deviate from the technology of the present invention.

What is claimed is:

1. An electrolyte for a secondary battery comprising:

a lithium salt;

a non-aqueous organic solvent; and a nitrile compound represented by Chemical Formula 1 below:

[Chemical Formula 1]

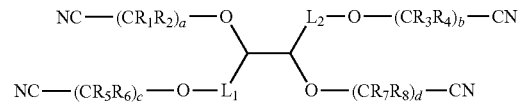

in Chemical Formula 1, $L_1$ and $L_2$ are each independently (C1-C10)alkylene, wherein the alkylene is optionally substituted with one or more selected from the group consisting of (C1-C7)alkyl, (C1-C7)alkoxy, (C1-C7)alkoxycarbonyl, and (C6-C12)aryl;

$R_1$ to $R_8$ are each independently hydrogen, (C1-C7)alkyl, (C1-C7)alkoxy, (C1-C7)alkoxycarbonyl or (C6-C12)aryl; and a to d are each independently an integer of 1 to 10.

2. The electrolyte for a secondary battery of claim 1, wherein the nitrile compound is represented by Chemical Formula 2, Chemical Formula 3, Chemical Formula 4 or Chemical Formula 5 below:

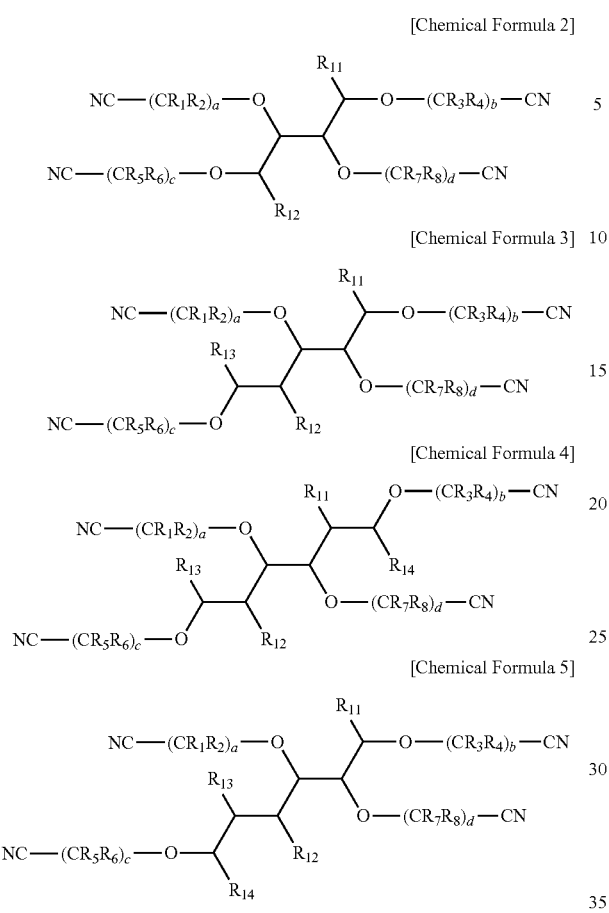

in Chemical Formulas 2 to 5,
$R_1$ to $R_8$ are each independently hydrogen, (C1-C7)alkyl or (C1-C7)alkoxy; and
$R_{11}$ to $R_{14}$ are each independently hydrogen, (C1-C7) alkyl, (C1-C7)alkoxy or (C6-C12)aryl; and
a to d are each independently an integer of 2 to 5.

3. The electrolyte for a secondary battery of claim 2, wherein the nitrile compound is selected from the following structures:

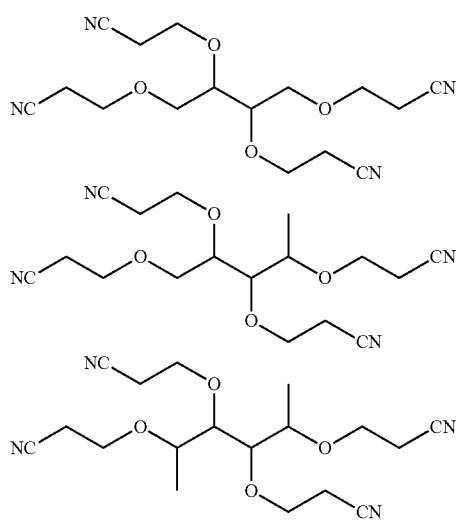

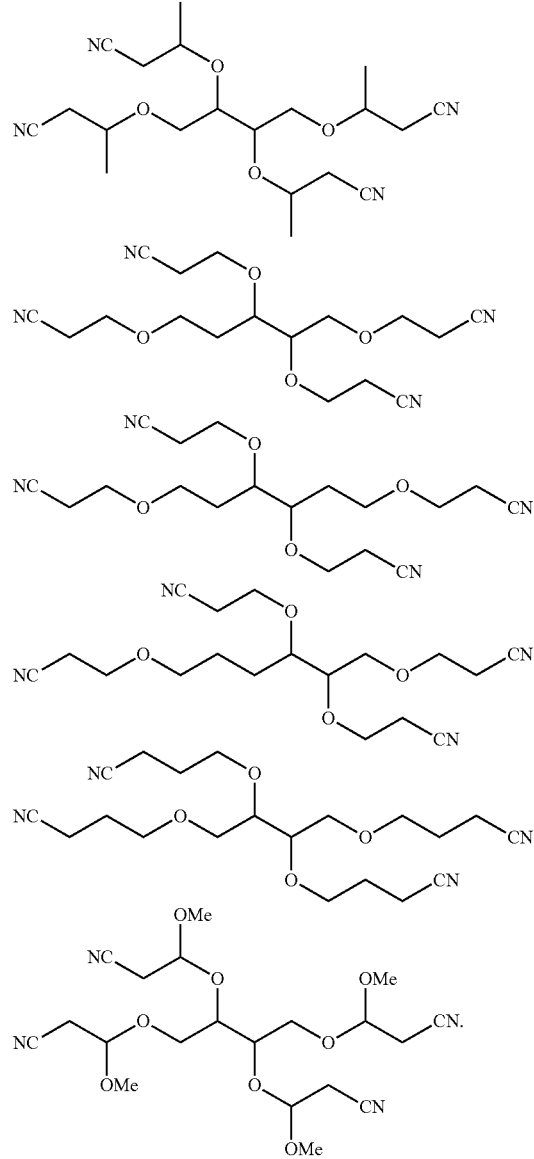

4. The electrolyte for a secondary battery of claim 2, wherein the nitrile compound represented by Chemical Formula 1 has a content of 0.1 wt % to 15.0 wt % based on a total weight of the electrolyte.

5. The electrolyte for a secondary battery of claim 1, further comprising:
at least one additive selected from the group consisting of an oxalatophosphate-based compound, an oxalatoborate-based compound, a carbonate-based compound substituted with fluorine, a vinylidene carbonate-based compound, and a sulfinyl group-containing compound.

6. The electrolyte for a secondary battery of claim 5, further comprising:
an additive selected from the group consisting of lithium tetrafluoro(oxalato)phosphate (LiTFOP), lithium difluoro bis(oxalato)phosphate (LiDFOP), lithium difluoro oxalatoborate (LiDFOB), lithium bisoxalatoborate (LiB($C_2O_4$)$_2$, LiBOB), fluoro ethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

7. The electrolyte for a secondary battery of claim 5, wherein the at least one additive has a content of 0.1 wt % to 5.0 wt % based on a total weight of the electrolyte.

8. The electrolyte for a secondary battery of claim 1, wherein the non-aqueous organic solvent is selected from a cyclic carbonate-based solvent, a linear carbonate-based solvent and a mixed solvent thereof.

9. The electrolyte for a secondary battery of claim 8, wherein the cyclic carbonate is selected from the group consisting of ethylene carbonate, propylene carbonate, butylene carbonate, vinylene carbonate, vinyl ethylene carbonate, fluoro ethylene carbonate, and a mixture thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

10. The electrolyte for a secondary battery of claim 8, wherein a mixed volume ratio of the linear carbonate-based solvent and the cyclic carbonate-based solvent in the non-aqueous organic solvent is 1:1 to 9:1.

11. The electrolyte for a secondary battery of claim 1, wherein the lithium salt is one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are natural numbers), LiCl, LiI and $LiB(C_2O_4)_2$.

12. The electrolyte for a secondary battery of claim 1, wherein the lithium salt is present at a concentration of 0.1 M to 2.0 M.

13. A lithium secondary battery comprising the electrolyte for a secondary battery of claim 1.

\* \* \* \* \*